2,206,283
Patented Sept. 14, 1965

3,206,283
METHOD OF PRODUCING BORON HALIDES
Henry L. Bikofsky, New York, Benjamin J. Luberoff, Monsey, Robert N. Rickles, Brooklyn, and Jack V. Papazian, New York, N.Y., assignors to Stauffer Chemical Company, New York, N.Y., a corporation of Delaware
No Drawing. Filed Feb. 20, 1962, Ser. No. 174,394
7 Claims. (Cl. 23—205)

This invention pertains to a new and novel method for the production of boron chlorides and fluorides by the high temperature halogenation, in the presence of silica, of anhydrous metal borates while utilizing as the halogenating agent, a halide of a basic metal.

The manufacture of boron trifluoride, as commonly practiced in the art, comprises treating borax with hydrofluoric and sulfuric acids. This method is objectionable from a commercial standpoint in that the reactants are expensive and extremely corrosive, making them inconvenient and obnoxious to handle.

A procedure which has been proposed to avoid the utilization of corrosive starting materials involves the high temperature reaction of a large excess of boric oxide with fluorspar in the dry state. However, boric oxide is rather costly when used in large scale operations and the need to employ this intermediate in stoichiometric excess has imposed a limitation on the aforedescribed process.

It has now been discovered that boron halides, i.e., the chlorides and fluorides, can be manufactured in excellent yields by reacting at high temperatures, the halide of a basic metal with an anhydrous metal borate salt in the presence of silica. Anhydrous metal borates which are suitable for practicing the invention include the borates of the alkali metals, e.g. sodium, potassium, lithium, etc. and the alkaline earth metals, e.g. barium, calcium, magnesium, etc. In carrying out the reaction, the ingredients are heated to fusion and maintained in a molten state whereby the boron halide as it is formed is conducted from the reaction mixture to a cooled recovery zone. Typically anhydrous sodium borate, silica and fluorspar are heated at a temperature ranging from 1100° C. to 1600° C. during which time an essentially stoichiometric quantity of boron trifluoride is evolved. The course of the reaction can be schematically represented in the equation below:

(1) $6CaF_2 + 7SiO_2 + Na_2B_4O_7 \rightarrow 4BF_3 + Na_2SiO_3 + 6CaSiO_3$

It will be seen that in addition to the boron trifluoride there is also formed a metal silicate in which at least part of the metal is derived from the metal halide halogenating agent. Anhydrous sodium borate is a cheap and plentiful raw material readily obtainable by the dehydration of borax, and is the preferred boron source for a commercial operation based on the above depicted reaction. Whereas the equation requires 6 moles of fluorspar and 7 moles of silica to effectively convert all of the borax to boron trifluoride, it is sometimes desirable to employ an excess of one or more of the reactants in order to achieve a proper consistency of the reaction mixture at the particular temperature employed. In this connection, generally excellent results ensue when using from about 2 to 8 moles of silica and about 3 to 12 moles of fluorspar per mole of borax.

As above pointed out, anhydrous metal borates salts of the alkaline earth or alkali metal series constitute the boron sources for practicing the invention. Such salts may be naturally occurring, i.e. natural minerals, or they may be produced synthetically. Examples of suitable anhydrous salts include sodium tetraborate; calcium borate; colemanite, a calcium borate; kernite, a sodium tetraborate, pandermite, a calcium borate. The invention also contemplates the utilization of anhydrous borate salts containing more than one basic metal and, in this connection, reference is made to kramerite and ulexite which are calcium sodium borates. It is apparent that other anhydrous borate salts and minerals could be used in carrying out the invention but the above set forth list represents typical materials of the sort which are readily available and accessible.

It is to be understood that anhydrous metal borates as used herein refer to salts of boric acid of the type derived from boron trioxide and characterized by the general formula $$H_xB_yO_z$$

wherein $z = \frac{3}{2}y + \frac{1}{2}x$, $x$ being an integer of from 1 to 3 and $y$ an integer having the values 1 and 4.

The term "basic metal," the fluorides and chlorides of which are used as halogenating agents in carrying out the process of this invention, refers to those metallic elements which form basic oxides of the type exhibiting a basic reaction in aqueous media. Such basic oxides are those of the alkali metals, i.e. sodium potassium and lithium as well as the alkaline earth metals, i.e. calcium, barium and strontium.

In producing boron trifluoride in accordance with the invention, there is also found a by-product of silicon tetrafluoride but the formation of this subsidiary material can be minimized by controlled the temperature of the reaction coupled with the proper selection of reactant ratios. For instance, the formation of silicon tetrafluoride can be suppressed by performing the reaction at a temperature in the neighborhood of 1350° C. while maintaining the calcium fluoride/borax ratio 1–14:1 and the silica/borax ratio 3–5:1.

Reference is now made to the following examples, the purpose of which is to illustrate the herein described process in greater detail but those skilled in the art to which the said invention pertains will appreciate that such examples are not to be construed as limiting or otherwise restricting the invention, or departing from the spirit thereof.

BORON TRIFLUORIDE

*Example 1*

202 g. of anhydrous borax was added to a finely pulverized mixture of 468 g. of fluorspar and 420 g. of silica sand. The reactants were heated to 1200° C. and maintained at that temperature for 90 minutes. During this interval, there was collected 250 g. of boron trifluoride and 10 g. of silicon tetrafluoride.

*Example 2*

A finely powdered mixture of 101 g. of anhydrous borax, 150 g. of silica and 252 g. of sodium fluoride was heated at a temperature of 1500° C. for 4 hours. During this time there was distilled from the reaction mixture 120 g. of boron trifluoride and 10 g. of silicon tetrafluoride.

*Example 3*

A finely powdered mixture consisting of 202 g. of anhydrous borax, 666 g. of calcium chloride (anhydrous CaCl₂) and 420 g. of silica was heated in a molten condition at 1450° C. for 4 hours. During this period there was distilled from the reaction mixture 400 g. of boron trichloride.

*Example 4*

A finely divided mixture of 202 g. anhydrous borax, 700 g. of sodium chloride and 420 g. of silica were fused together at 1300° C. for 4 hours. During this interval there was collected from the reaction mixture 325 g. of boron trichloride.

*Example 5*

The procedure of Example 1 was repeated except the amount of silica was reduced by one-half. During 60 minutes 130 g. of boron trifluoride was collected together with 1.5 g. of silicon tetrafluoride.

We claim:

1. The process of producing a boron halide selected from the class consisting of boron trifluoride and boron trichloride which comprises reacting in the fused state and in the presence of silica an anhydrous metal salt of a boric acid having the following general formula $$H_xB_yO_z$$

wherein $z=\frac{3}{2}y+\frac{1}{2}x$, $x$ being an integer of from 1 to 3 and $y$ an integer having the values 1 and 4, said metal of the metal salt being selected from the class consisting of the alikali metals and alkali earth metals with a basic metal halide selected from the class consisting of alkali metal fluorides, alkali metal chlorides, alkali earth metal fluorides and alkali earth metal chlorides thereby forming, as the essential product of the reaction, boron trihalide and a metal silicate, at least part of the metal of the metal silicate being derived from the metal of the basic metal halide salt, the reaction temperature being sufficient to volatilize the boron halide but not the metal silicate and collecting the so volatilized boron halide in a recovery zone.

2. The process according to claim 1 wherein the halide of the basic metal is an alkali metal halide.

3. The process according to claim 1 wherein the halide of the basic metal is an alkaline earth metal halide.

4. The process according to claim 2 wherein the halide of the basic metal is sodium chloride.

5. The process according to claim 3 wherein the halide of the alkaline earth metal is anhydrous calcium chloride.

6. The process according to claim 1 wherein the anhydrous metal salt of boric acid is anhydrous sodium borate.

7. The process according to claim 3 wherein the halide of the alkaline earth metal is calcium fluoride in the form of fluorspar.

References Cited by the Examiner

UNITED STATES PATENTS

| 2,163,232 | 6/39 | Baldeschwieler | 23—205 |
| 3,067,012 | 12/62 | Seltzer et al. | 23—205 |

FOREIGN PATENTS 583,910   10/58   Italy.

MAURICE A. BRINDISI, *Primary Examiner*.